No. 772,634. PATENTED OCT. 18, 1904.
D. B. SNYDER.
SPLIT COLLAR.
APPLICATION FILED AUG. 19, 1904.
NO MODEL.
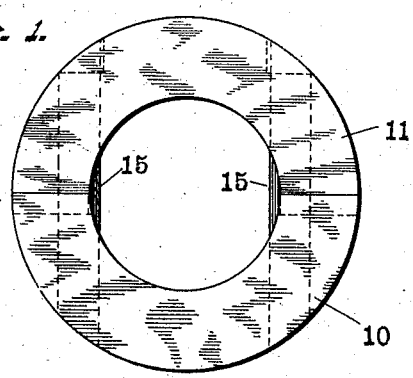
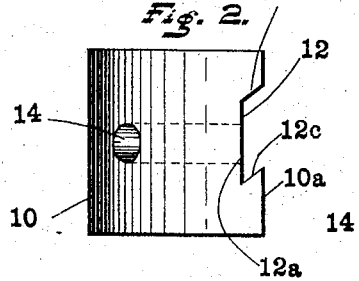
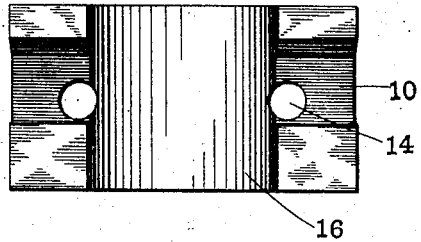
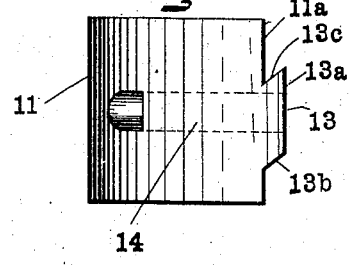
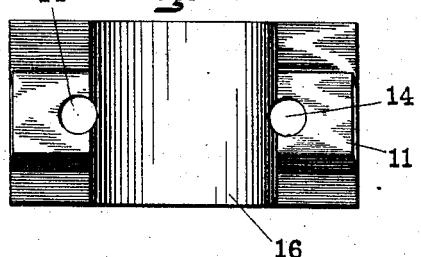
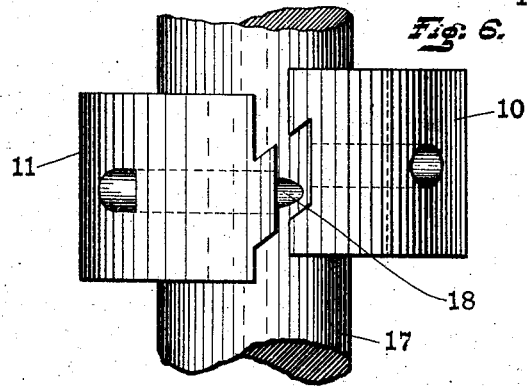
Witnesses
J. A. Miner.
J. A. Walsh.
Inventor
David B. Snyder.
By Bradford & Hood
Attorneys No. 772,634. Patented October 18, 1904.

UNITED STATES PATENT OFFICE.

DAVID B. SNYDER, OF COLUMBUS, INDIANA.

SPLIT COLLAR.

SPECIFICATION forming part of Letters Patent No. 772,634, dated October 18, 1904.

Application filed August 19, 1904. Serial No. 221,312. (No model.)

*To all whom it may concern:*

Be it known that I, DAVID B. SNYDER, a citizen of the United States, residing at Columbus, in the county of Bartholomew and State of Indiana, have invented certain new and useful Improvements in Split Collars, of which the following is a specification.

The object of my invention is to provide a simple yet efficient means for connecting two parts of a split collar or any article together and to a shaft or other part.

The accompanying drawings illustrate my invention.

Figure 1 is a plan. Fig. 2 is a side elevation of the female member of the collar; Fig. 3, an elevation at right angles to Fig. 2; Fig. 4, a side elevation of the male member; Fig. 5, an elevation of the part shown in Fig. 4, at right angles thereto; and Fig. 6, an elevation showing the manner of assembling the parts.

In the drawings, 10 and 11 indicate the female and male halves, respectively, of the collar, each of which is substantially semi-annular in form. At each end of the arc of the member 10 I form a notch 12, which has one side $12^a$ parallel with the face or end $10^a$ and a pair of surfaces $12^b$ and $12^c$, which connect the upper and lower ends of the face $12^a$ with the face $10^a$, the surfaces $12^b$ and $12^c$ being parallel and inclining from the horizontal. The member 11 is provided on each of its ends $11^a$ (which mate with the ends $10^a$ of the female member) with a male member 13, adapted to fit closely in the notch 12 and is therefore provided with an end surface $13^a$ and inclined side surfaces $13^b$ and $13^c$, arranged relatively to $13^a$ the same as the surfaces $12^b$ and $12^c$, respectively, are arranged with relation to the surface $10^a$. Formed transversely through the two members 10 and 11 are openings 14, through each of which a pin 15 may be passed. The opening 14 may be of any desired cross-section, but is arranged to intersect the bore 16 of the members, and it is therefore necessary to provide the receiving-shaft 17 with a tangential groove 18 to receive each pin. If desired, the grooves 18 may be omitted and pins 15 slightly flattened on one side, or the pins may be made of hardened steel and driven in, so as to cut their own shallow grooves in the shaft.

In operation one member of the collar is placed upon the shaft with its holes 14 in alinement with the notches 18, and the other member is then brought to the position shown in Fig. 6, whereupon the two members may be assembled by a combined transverse and axial movement parallel with the surfaces $12^a$ and $12^b$, thus bringing the openings 14 of the two members substantially in line, whereupon the pins 15 may be inserted, thus drawing the two members closely together and fastening them upon the shaft.

I claim as my invention—

1. A split collar consisting of a pair of semi-annular members, the male member being provided at its ends with projecting lugs defined by side surfaces which are inclined to the axis and parallel with each other, and the female member having notches formed in its ends corresponding in shape to the lugs of the male member, whereby the parts may be assembled by a combined transverse and axial movement.

2. A split collar consisting of a pair of semi-annular members, the male member being provided at its ends with projecting lugs defined by side surfaces which are inclined to the axis and parallel with each other, and the female member having notches formed in its ends corresponding in shape to the lugs of the male member, whereby the parts may be assembled by a combined transverse and axial movement, and said members having transverse openings formed therethrough, and a pin passing through each opening.

3. A split collar consisting of a pair of semi-annular members, the male member being provided at its ends with projecting lugs defined by side surfaces which are inclined to the axis and parallel with each other, and the female member having notches formed in its ends corresponding in shape to the lugs of the male member, whereby the parts may be assembled by a combined transverse and axial movement, said members having transverse openings passing therethrough one at each side but intersecting the bore thereof, a shaft adapted to receive said members and provided with tangential grooves alining with said transverse openings of the collar members, and a pin passed through each opening and through the adjacent tangential notch of the shaft.

In witness whereof I have hereunto set my hand and seal, at Columbus, Indiana, this 13th day of August, A. D. 1904.

DAVID B. SNYDER. [L. S.]

Witnesses:
  HARRY H. FOSTER,
  FRED J. WEIB.